UNITED STATES PATENT OFFICE.

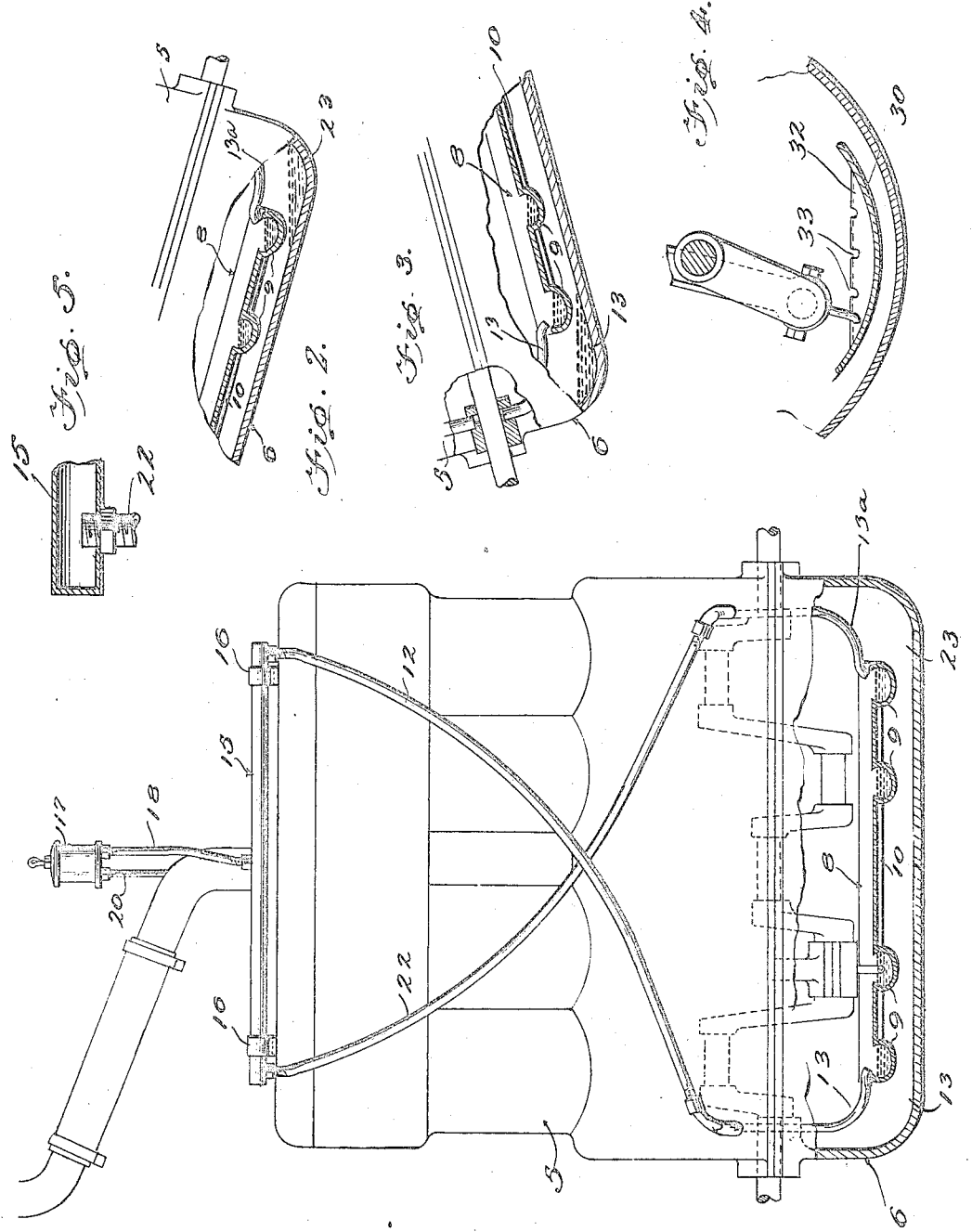

ALBERT E. NICHOLLS, OF WILSON CREEK, WASHINGTON.

INTERNAL-COMBUSTION ENGINE 1,423,677.  Specification of Letters Patent.  Patented July 25, 1922.

Application filed May 17, 1921. Serial No. 470,346.

*To all whom it may concern:*

Be it known that I, ALBERT E. NICHOLLS, a citizen of the United States, and a resident of Wilson Creek, in the county of Grant and State of Washington, have invented certain new and useful Improvements in Internal-Combustion Engines, of which the following is a specification.

This invention relates to internal combustion engines and more particularly to the lubricating means for the same.

Briefly stated, an important aim of this invention is to provide novel means whereby the flow of oil to the end crank shaft and connecting rod bearings of an internal combustion engine is automatically regulated and controlled by the position of the motor. For instance, if the vehicle to which the motor is attached is ascending a hill, the end crank shaft and connecting rod bearings are naturally strained and in some cases improperly lubricated because of a faulty splash system, and in accordance with this invention the forward crank shaft and connecting rod bearings are provided with an increased flow of oil when the motor is ascending a hill.

A further object of the invention is to provide an oil supply system for internal combustion engines which is highly accessible and which does not interfere with the supply of oil which is supplied to the crank shaft and connecting rod bearings when the motor is arranged horizontally.

Other objects and advantages of the invention will be apparent during the course of the following description.

In the accompanying drawings forming a part of this application and in which like numerals are employed to designate like parts throughout the same.

Figure 1 is a side elevation of an internal combustion engine equipped with the improved oil supply means, parts being shown in section.

Figure 2 is a detail view illustrating the motor in an inclined position.

Figure 3 is a detailed view through the motor inclined in the opposite direction.

Figure 4 is a vertical transverse sectional view illustrating a modified form of oil pan.

Figure 5 is a detail view illustrating the manifold.

In the drawing, wherein for the purpose of illustration is shown a preferred embodiment of the invention, the numeral 5 generally designates an internal combustion engine provided with the usual crank case 6 within which an oil pan generally designated by the numeral 8 is arranged.

As illustrated in Figure 1, the oil pan which extends longitudinally within the crank case is provided with a plurality of transverse troughs 9 into which the connecting rod bearings dip to receive a quantity of oil. As shown by my United States Patent #1,346,840 communication is established between the transversely extending troughs by means of conduits 10 which are arranged beneath the surface of the oil pan and are connected at their ends to the sides of the trough. Therefore, when the motor is inclined, the oil will flow from one trough to the other and when the motor is level, the oil contained within the trough will have the same level.

The invention forming the subject matter of this application resides in supplying an increased quantity of oil to the highest portion of the oil pan and main crank bearings when the motor is ascending a hill and under active labor or when the motor is descending a hill. Specifically, the means employed for providing the oil pan and main crank shaft bearings with an increased supply of oil when ascending a hill includes an oil manifold 15, extending longitudinally of the motor and having oil pipes 12 and 22 extending up and into the manifold a convenient distance to carry a reserve supply of oil when moving on a comparatively level surface, but as soon as either end of motor is elevated the supply of oil so carried is promptly discharged through pipes 12 or 22, to main crank shaft bearings and the pan, at 13 and 13ᴬ.

As illustrated in Figure 1, the upper portion of the oil conveying pipe 12 is connected to the rear end of and extends up into the oil manifold 15 which is secured to the upper side of the cylinder by means of fastening devices 16. If the cylinder head is detachable, the fasteners 16 may be secured in position by the bolts which hold the cylinder, head in position or in case the cylinder head is integral, the fasteners 16 may be held in position by means of separate bolts.

The oil manifold extends longitudinally of the motor and receives a quantity of oil from an oil cup 17 or other source of supply, such as a pump, the said oil cup being supported above the manifold by means of a pipe 18. The oil cup 17 is supplied with oil by means of a distributer pipe 20 which may extend from the main reservoir or supply pump. The oil cup 17 will indicate the condition or circulation of oil through the pipes, and when necessary a convenient means of priming.

As soon as the motor is inclined by reason of ascending a hill, or otherwise, the flow of oil is started from reserve contained in 15 through pipe 12 or 22 for supplying the forward or rear connecting rod or main crank shaft bearing with an increased quantity of oil.

In the form of the invention illustrated in Figure 4, the oil pan generally designated by the numeral 30 is provided with spaced transversely extending troughs 32 adapted for the reception of a quantity of lubricating oil whereby a small quantity of oil is picked up when the connecting rod bearings reach the limit of their downward movement. As further illustrated in this figure the oil pan is provided with longitudinally extending spaced parallel reinforcing corrugations 33 which are open at their ends and establish communication between the same so that the oil may flow either to the forward or rear portions of the crank case With reference to the foregoing description taken in connection with the accompanying drawings it will be apparent that a lubricating system constructed in accordance with this invention will effectively feed the oil so that an increased quantity of oil is supplied to the bearings most in need of it. Further, the device does not interfere with the pumping of oil to the several bearings or to the oil pan.

Having thus described the invention, what is claimed is:—

1. The combination with an internal combustion engine having a crank case, of a horizontally arranged longitudinally extending manifold secured to the upper portion of the engine and extending for the major portion of the length of the engine oil distributing pipes having their upper terminal portions extended into the terminal portions of said manifold and terminating above the lower wall of the interior of the manifold thereby providing an oil reserved space extending for the entire length of the manifold, said oil distributing pipes being crossed and having their lower terminal portions connected to said crank case.

2. The combination with an internal combustion engine having main bearings and an oil pan provided with troughs, of an oil manifold secured to the upper portion of said engine and extending longitudinally of the same, and separate branch pipes connected to and extending into said manifold and discharging onto the main bearings and trough, said branch pipes being inclined and crossed, whereby the elevated main bearings are supplied with an increased supply of oil.

3. The combination with an internal combustion engine having cylinders and an oil pan provided with troughs, of a horizontal oil manifold connected to the upper portion of said cylinders, and inclined pipes extending into said horizontal manifold and terminating above the bottom of the same, thereby defining an oil reserve space.

4. The combination with an internal combustion engine having main bearings and an oil pan, of an oil manifold secured in a horizontal position to the upper portion of said engine, crossed separate pipes extending into the terminal portions of said manifold and terminating between the upper and lower sides of the manifold thereby defining an oil reserve space, and means to supply oil to said manifold between said pipes, said pipes being arranged to supply oil to the main bearings and the oil pan.

5. An oil pan comprising a body having a plurality of spaced transversely extending troughs adapted for the reception of oil and spaced longitudinally extending reinforcing corrugations opening into said trough and establishing communication between the same.

ALBERT E. NICHOLLS